Patented May 8, 1928.

1,669,384

UNITED STATES PATENT OFFICE.

HANS WALTER, OF MAINZ-MOMBACH, GERMANY, ASSIGNOR TO VEREIN FUR CHEMISCHE INDUSTRIE AKTIENGESELLSCHAFT, OF FRANKFORT-ON-THE-MAIN, GERMANY, A CORPORATION.

MANUFACTURE OF ADDITION COMPOUNDS OF UNSATURATED HYDROCARBONS.

No Drawing. Application filed January 18, 1927, Serial No. 161,950, and in Germany January 21, 1924.

This invention relates to improvements of the known processes by which acetylene gas is introduced into a dilute acid solution for the purpose of obtaining an addition of water to the acetylene by the catalytic action of mercury salt or mercury oxide. It is also known to combine in the same manner other substances with acetylene, or other non-saturated hydrocarbons, to produce analogous compounds.

In the said process, in which the reaction takes place in a fluid medium, the catalyzer is suspended in the liquid in a very fine state of subdivision, but it becomes inactive in a short time and is precipitated in the form of a dark sludge containing by-products of the main reaction, such as reduction products and resins. This sludge may be regenerated, but the process of regeneration is costly and does not allow of a continuous process. This regenerating process has been performed in German Patent No. 419,435 by passing a current of steam through the sludge.

The present invention consists in passing steam together with the acetylene into the dilute acid solution. By this way of proceeding the addition of the water molecules takes place without impairing the catalyzer in any way. Consequently the catalyzer may be used for an infinite period of time and the process may be conducted continuously. Practically the volume of steam employed should not be less than 75% of the volume of acetylene gas.

The effect of the steam may be explained by the fact that the steam not entering into the reaction forms a gaseous atmosphere in which the reaction takes place without the side-reactions causing the production of sludge, or that the generated by-products are carried along with the steam not entering into reaction and escape with the gases formed. This process may be applied to the vapour of all the substances which form addition compounds with acetylene under the well-known fundamental conditions of the process for the production of the corresponding products. In this way acetaldehyde will be formed by introducing aqueous vapour into an aqueous acid solution, and ethylidene diacetate

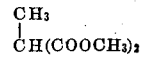

by introducing glacial acetic acid vapour into glacial acetic acid.

All the substances to be added to non-saturated hydrocarbons mentioned in the following examples are equivalents in this process, since they are known to form addition compounds under the above named general conditions and under the influence of a mercury catalyzer.

*Example 1.*—500 ccm. 25 per cent sulfuric acid containing 16 grs. mercury oxide (HgO) in solution are heated to ebullition and a mixture of acetylene gas and steam is passed at the rate of 6 litres acetylene gas and 300 grs. steam per hour. After eight hours the condensed liquid contains 18 grs. acetaldehyde.

*Example 2.*—30 grs. mercury oxide (HgO) are dissolved in one litre of hot glacial acetic acid. The solution is heated in a paraffine bath to 125–135° C. and a mixture of 15 litres acetylene gas and about 1,000 grs. glacial acetic acid vapour is passed through the boiling liquor. After 4 hours the distilled liquor contains 170 grs. ethylidene diacetate.

*Example 3.*—A mixture of acetylene gas and propionic acid vapour ($CH_3CH_2COOH$) in the proportion of about 1:3 is passed through a solution of 12 grs. mercury oxide (HgO) in 150 ccm. propionic acid. The condensed liquor consists of propionic acid and ethylidene propionate

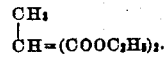

The yield is 60%.

*Example 4.*—10 grs. mercury oxide are dissolved in 100 grs. fused trichloracetic acid ($CCl_3COOH$). The solution is heated to ebullition at a pressure of 100 mm. and a mixture of acetylene gas and trichloracetic acid vapour is passed through it. The condensed liquor consists of trichloracetic acid and trichloracetic acid vinyl ester

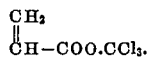

Example 5.—15 grs. mercury phosphate are suspended in 120 grs. isobutyl alcohol and a mixture of isobutyl alcohol vapour and acetylene gas is passed through the boiling liquor. The condensed liquor consists of isobutyl alcohol and ethylidene isobutyl ether

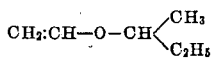

with a yield of 70%.

Example 6.—15 grs. mercury sulfate are dissolved in 200 grs. ethylene glycol. The liquid is then heated to ebullition and a mixture of glycol vapour and acetylene gas is passed through at a pressure of 60 mm. The condensed liquor contains ethylene-ethylidene ether

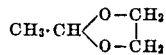

in a good yield.

Example 7.—10 grs. mercury oxide are dissolved in 150 ccm. 20% sulfuric acid. The solution is heated to ebullition and a mixture of aqueous vapour and allylene ($CH_3-C'\equiv CH$) in the proportion of about 3 vol.:1 passed through. The distilled liquor contains acetone in almost the theoretical quantity.

Example 8.—20 grs. mercury oxide are dissolved in 150 ccm. absolute glacial acetic acid, the solution is then heated to ebullition and a mixture of glacial acetic acid vapour and allylene gas passed through. The distilled liquor contains glacial acetic acid and acetone and acetic anhydride in a very good yield.

Example 9.—10 grs. mercury phosphate are suspended in 150 grs. isobutyl alcohol and a mixture of isobutyl alcohol vapour and allylene gas is passed through the boiling liquor. The distilled liquor consists of isobutyl alcohol and methylvinylisobutyl ether ($CH_3CH=CH-O-CH(CH_3)_2$) in a good yield.

What I claim is:

1. In the art of manufacturing addition compounds of unsaturated hydrocarbons in the presence of a non-metallic liquid catalyzer the process which comprises substantially concurrently contacting with the non-metallic liquid catalyzer an unsaturated hydrocarbon and a vapor of a substance forming an addition product with the hydrocarbon, said vapor being produced outside of the zone of catalysis.

2. In the art of manufacturing addition compounds of unsaturated hydrocarbons in the presence of a mercury-containing catalyzer, the process which comprises concurrently contacting with a mercury compound contained in an acid liquid medium, an unsaturated hydrocarbon and a vapor of a substance forming an addition product with the unsaturated hydrocarbon in the presence of the acid liquid medium and the mercury compound, said vapor being generated outside of the zone of catalysis.

3. In the art of manufacturing addition compounds of hydrocarbons, the process which comprises contacting an unsaturated hydrocarbon and a vapor with a metal compound catalyzer, said vapor being capable of forming an addition product with said unsaturated compound in the presence of said catalyzer, said catalyzer being contained in a liquid corresponding to the liquid phase of said vapor.

4. The process of producing a reaction between an unsaturated hydrocarbon and steam which comprises contacting steam and the unsaturated hydrocarbon with an acid liquid containing a catalyzer.

5. The process of producing a reaction between acetylene and steam which comprises contacting steam and acetylene substantially concurrently with an acid liquid containing a catalyzer.

6. In the art of manufacturing an addition compound from an X unsaturated hydrocarbon by reaction with a Y compound which comprises contacting the X hydrocarbon and the vapor of the Y compound substantially simultaneously with a catalyzer in the presence of the liquid phase of the Y compound, said vapor of the Y compound being generated outside of the zone of catalysis and wherein the X compound is a member of the group comprising acetylene and allylene and the Y compound is a member of the group comprising water, glacial acetic acid, propionic acid, trichloracetic acid, isobutyl alcohol and glycol.

7. In the art of manufacturing addition compounds of unsaturated hydrocarbons in the presence of a compound of mercury, the process which comprises contacting an unsaturated hydrocarbon and the vapor of a substance forming an addition product with the hydrocarbon with a liquid containing an acid and a compound of mercury, and regulating the volumes of the unsaturated hydrocarbon and the said substance during said contact in such a manner that the volume of said substance is in essential excess over the volume of the unsaturated hydrocarbon.

In testimony whereof I have affixed my signature this 5th day of January, 1927.

HANS WALTER.